(12) United States Patent
Teraura

(10) Patent No.: US 11,941,481 B2
(45) Date of Patent: Mar. 26, 2024

(54) TWO-DIMENSIONAL SYMBOL AND METHOD FOR READING TWO-DIMENSIONAL SYMBOL

(71) Applicant: TERRARA CODE RESEARCH INSTITUTE INC., Aichi (JP)

(72) Inventor: Nobuyuki Teraura, Aichi (JP)

(73) Assignee: TERRARA CODE RESEARCH INSTITUTE INC., Aichi (JP)

( * ) Notice: Subject to any disclaimer, the term of this patent is extended or adjusted under 35 U.S.C. 154(b) by 2 days.

(21) Appl. No.: 17/716,774

(22) Filed: Apr. 8, 2022

(65) Prior Publication Data

US 2022/0269877 A1    Aug. 25, 2022

Related U.S. Application Data

(63) Continuation of application No. PCT/JP2020/036772, filed on Sep. 29, 2020.

(30) Foreign Application Priority Data

Oct. 11, 2019   (JP) .................................. 2019-188222

(51) Int. Cl.
   *G06K 7/14*   (2006.01)
   *H04L 9/30*   (2006.01)
   *H04L 9/32*   (2006.01)

(52) U.S. Cl.
   CPC ......... *G06K 7/1473* (2013.01); *G06K 7/1486* (2013.01); *H04L 9/30* (2013.01); *H04L 9/3247* (2013.01)

(58) Field of Classification Search
   CPC .. G06K 7/1473; G06K 7/1486; G06K 7/1417; G06K 19/06037; H04L 9/30;
   (Continued)

(56) References Cited

U.S. PATENT DOCUMENTS

2006/0226229 A1* 10/2006 Kim ................. G06K 19/06037
                                                        235/462.1
2009/0184171 A1*  7/2009 Lv ........................... G06V 10/24
                                                        235/494
(Continued)

FOREIGN PATENT DOCUMENTS

JP    2003-346077 A    12/2003
JP    2009087286 A  *  4/2009
(Continued)

OTHER PUBLICATIONS

JP6473899B1 Composite Code Pattern, Generating Device, Reading Device, Method, and Program, 79 pages. (Year: 2023).*
(Continued)

*Primary Examiner* — Tuyen K Vo
(74) *Attorney, Agent, or Firm* — Rimon P.C.

(57) ABSTRACT

The present invention facilitates, in a two-dimensional symbol in which a region where additional data is recorded is provided in addition to a region where normal data is recorded, identification of colors of the regions where the respective data are recorded. Vertically and horizontally arranged first modules are provided, and by the coloration patterns of the first module, a finder pattern for detecting a symbol position, a timing pattern for specifying the center position of the first module, and a first recording region where first data can be recorded are formed. In at least a partial region, a second module is disposed in a portion that does not overlap the first module and includes an intermediate point between the first modules adjacent to each other, and a second recording region where second data can be recorded is formed by the coloration pattern of the second module.

14 Claims, 9 Drawing Sheets

(58) Field of Classification Search
CPC ....... H04L 9/3247; H04L 9/3263; G09C 5/00; G09C 1/00
See application file for complete search history.

(56) References Cited

U.S. PATENT DOCUMENTS

| | | | | |
|---|---|---|---|---|
| 2016/0140374 | A1* | 5/2016 | Ye | G06K 7/1417 |
| | | | | 235/462.07 |
| 2017/0200035 | A1 | 7/2017 | Teraura | |
| 2018/0205556 | A1* | 7/2018 | Rieul | H04L 9/3247 |
| 2019/0075456 | A1* | 3/2019 | Evans | G09C 5/00 |
| 2020/0074129 | A1* | 3/2020 | Shen | G06Q 30/00 |
| 2021/0099872 | A1* | 4/2021 | Suzuki | H04W 12/0471 |

FOREIGN PATENT DOCUMENTS

| | | | | |
|---|---|---|---|---|
| JP | 2009-169878 | A | 7/2009 | |
| JP | 2014-085777 | A | 5/2014 | |
| JP | 2015-213288 | A | 11/2015 | |
| JP | 6473899 | B1 * | 2/2019 | ............... G06K 1/12 |
| WO | WO-2016108221 | A1 * | 7/2016 | ....... G06K 19/06037 |
| WO | 2017-104856 | A1 | 6/2017 | |
| WO | WO-2020204078 | A1 * | 10/2020 | ........... G06K 7/1417 |

OTHER PUBLICATIONS

JP2009087286A Two-Dimensional Code, and Its Reader, 9 pages. (Year: 2023).*

Office Action for Japan Patent Application No. 2019-188222, 6 pages, Japan Patent Office, dated Mar. 9, 2021, with English translation.

* cited by examiner

FIG.4A

| RECORDING AREA | RECORDING DATA |
|---|---|
| FIRST RECORDING AREA | - DATA CODEWORD(TEXT DATA OF "Diamond Symbol")<br>- ERROR CORRECTION CODEWORD(TEXT DATA OF "Diamond Symbol") |
| SECOND RECORDING AREA | - DATA CODEWORD(ENCRYPTED TEXT DATA OF "teraura")<br>- ERROR CORRECTION CODEWORD(ENCRYPTED TEXT DATA OF "teraura") |

FIG.4B

| RECORDING AREA | RECORDING DATA |
|---|---|
| FIRST RECORDING AREA | - DATA CODEWORD(TEXT DATA OF "Diamond Symbol")<br>- ERROR CORRECTION CODEWORD(TEXT DATA OF "Diamond Symbol") |
| SECOND RECORDING AREA | - DATA CODEWORD(ENCRYPTED TEXT DATA OF "teraura")<br>- ERROR CORRECTION CODEWORD(ENCRYPTED TEXT DATA OF "teraura") |
| THIRD RECORDING AREA | - DATA CODEWORD(BINARY DATA OF CREATION DATE)<br>- ERROR CORRECTION CODEWORD(BINARY DATA OF CREATION DATE) |

FIG.4C

| RECORDING AREA | RECORDING DATA |
|---|---|
| FIRST RECORDING AREA | - DATA CODEWORD(TEXT DATA OF "Diamond Symbol")<br>- ERROR CORRECTION CODEWORD(TEXT DATA OF "Diamond Symbol") |
| SECOND RECORDING AREA | - DATA CODEWORD(PUBLIC KEY ID + ELECTRONIC SIGNATURE)<br>- ERROR CORRECTION CODEWORD(PUBLIC KEY ID + ELECTRONIC SIGNATURE) |

FIG.4D

| RECORDING AREA | RECORDING DATA |
|---|---|
| FIRST RECORDING AREA | - DATA CODEWORD(TEXT DATA OF "Diamond Symbol")<br>- ERROR CORRECTION CODEWORD(TEXT DATA OF "Diamond Symbol") |
| SECOND RECORDING AREA | - DATA CODEWORD(TEXT DATA OF "Diamond Symbol")<br>- ERROR CORRECTION CODEWORD(TEXT DATA OF "Diamond Symbol") |
| THIRD RECORDING AREA | - DATA CODEWORD(TEXT DATA OF "Diamond Symbol")<br>- ERROR CORRECTION CODEWORD(TEXT DATA OF "Diamond Symbol") |

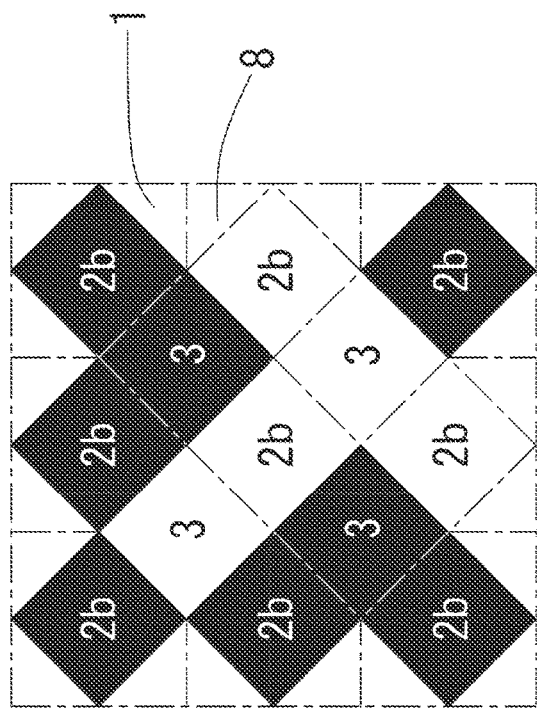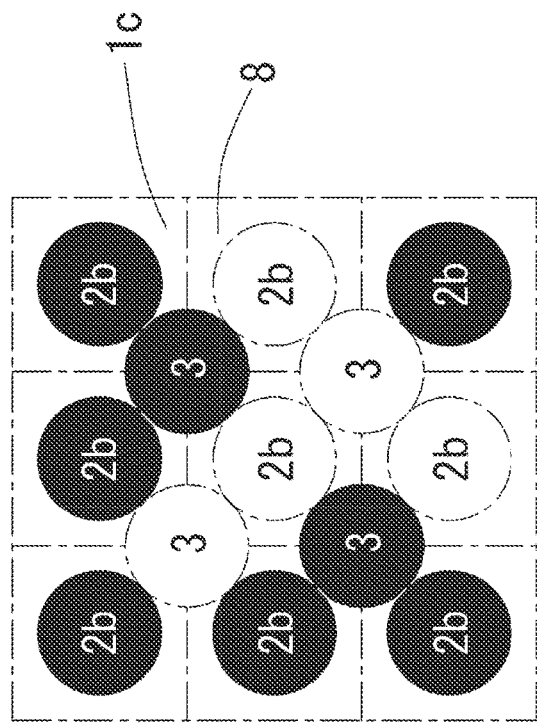
FIG.6A
FIG.6B

USING VISIBLE LIGHT

USING INFRARED LIGHT

TWO-DIMENSIONAL SYMBOL AND METHOD FOR READING TWO-DIMENSIONAL SYMBOL

RELATED APPLICATION

This application is a Continuation Application of International Application No.PCT/JP2020/036772, filed Sep. 29, 2020, which claims priority to Japan Application No.JP2019-188222, filed Oct. 11, 2019. The subject matter of each is incorporated herein by reference in entirety.

TECHNICAL FIELD

The present invention relates to a two-dimensional symbol that includes modules arranged vertically and horizontally.

BACKGROUND ART

In a general two-dimensional symbol such as a QR code®, data is recorded by a coloration pattern of modules that are arranged vertically and horizontally. In regard to the standardized two-dimensional symbol such as the QR code, the data recorded in the two-dimensional symbol can be decoded by using a mobile terminal or the like in which a reading program conforming to the relevant standard is installed.

In order to enhance a function of the standardized two-dimensional symbol, the inventor has proposed a two-dimensional symbol whose modules are subdivided, in which a center portion of each of the modules is colored in accordance with the standard of the standardized two-dimensional symbol, and in which an outer peripheral portion of each of the modules is colored in an independent color of the center portion (See Patent Literature 1). In such a two-dimensional symbol, while the data that can be read by a method for reading a two-dimensional symbol conforming to the existing standard is recorded by the coloration pattern of the center portions of the modules, additional data that can be read by a unique reading method is recorded by the coloration pattern of the outer peripheral portions of the modules.

CITATION LIST

Patent Literature

Patent Literature 1: Japanese Patent Application Publication No. 2014-085777

SUMMARY OF INVENTION

Technical Problem

In the two-dimensional symbol described in Patent Literature 1, two types of the data are recorded by the coloration pattern of the center portions of the modules and the coloration pattern of the outer peripheral portions of the modules. Thus, it has been desired to show both of the colors of the center portions and the outer peripheral portions of the modules such that a reader can sufficiently identify both of the colors. However, in the two-dimensional symbol described in Patent Literature 1, since the square module is divided into the center portion and the outer peripheral portion, it is difficult to make sizes and shapes of the center portion and the outer peripheral portion resemble each other.

In the case where the two-dimensional symbol has the modules, whose colors can relatively easily be identified, and the modules, whose colors are relatively difficult to be identified, the symbol has to be enlarged such that the colors of the modules, which are relatively difficult to be identified, can be identified. For this reason, it is not preferred to make a difference in ease of color identification between the center portion and the outer peripheral portion of the module.

The present invention has been made in view of such a circumstance and therefore has a purpose of facilitating color identification of each area for recording data in a two-dimensional symbol provided with an area where normal data is recorded and an area where additional data is recorded.

Solution to Problem

The present invention is a two-dimensional symbol that includes first modules arranged vertically and horizontally. By a coloration pattern of the first modules, the two-dimensional symbol is formed with a finder pattern for detecting a symbol position, a timing pattern for specifying a center position of the first modules, and a first recording area where first data can be recorded. In at least a part of an area, a second module is provided in a portion that does not overlap the first modules and that includes an intermediate point between the adjacent first modules. A second recording area where second data can be recorded is formed by a coloration pattern of the second modules.

In such a configuration, additional data can be recorded by the coloration pattern of the second modules. Such a second module is provided between the adjacent first modules in a manner to include the intermediate point between the adjacent first modules. Thus, the second module has greater freedom in a size and a shape than the outer peripheral portion of the module according to Patent Literature 1. Therefore, according to the two-dimensional symbol in the present invention, the sizes and the shapes of the first module for recording the first data and the second module for recording the second data can easily resemble each other, and colors of both of the first module and the second module can easily be identified.

In the present invention, it is proposed that, in at least the part of the area, each of the second modules is provided in a portion that includes a single intermediate point between the diagonally-adjacent first modules. In such a configuration, in at least the part of the area, the number of the first modules is substantially equal to the number of the second modules. Therefore, a capacity of the first recording area and a capacity of the second recording area can be substantially equal to each other.

In addition, in the case where the above configuration is adopted, it is proposed that, in at least the part of the area, each of the first module and the second module has a shape that includes a circle with a diameter of $1/\sqrt{2}$ of an arrangement interval of the first modules.

In general, as the diameter of the circle included in the module is increased, ease of the color identification of the module is improved. This is because influences of camera shake and the like at the time of imaging can be eliminated. In such a configuration, in the part of the area, each of the first module and the second module includes the circle in as large size as possible while the ease of the color identification is substantially the same between the first module and the second module. Therefore, it is possible to further improve the ease of the color identification of the first module and the second module.

In the present invention, it is proposed that, in at least the part of the area, each of the second modules is provided in a portion that includes any one of intermediate points between the vertically-adjacent, horizontally-adjacent, and diagonally-adjacent first modules. In such a configuration, in at least the part of the area, the number of the second modules is several times larger than the number of the first modules. Therefore, the second recording area can have the larger capacity than the first recording area.

In addition, in the case where the above configuration is adopted, it is proposed that, in at least the part of the area, each of the first module and the second module has a shape that includes a circle with a diameter of half an arrangement interval of the first modules.

In general, as the diameter of the circle included in the module is increased, the ease of the color identification of the module is improved. This is because the influences of the camera shake and the like at the time of imaging can be eliminated. In such a configuration, in the part of the area, each of the first module and the second module includes the circle in as large size as possible while the ease of the color identification is substantially the same between the first module and the second module. Therefore, it is possible to further improve the ease of the color identification of the first module and the second module.

In the present invention, it is proposed that, in at least the part of the area, the first module and the second module have square shapes with equal areas and are adjacent to each other without any clearance therebetween.

According to such a configuration, in at least the part of the area, the first module and the second module are arranged without any clearance therebetween, and the sizes and the shapes of the first module and the second module are equal to each other. Therefore, it is possible to equalize the ease of the color identification of the first module and the second module, and it is also possible to improve the ease of the color identification of the first module and the second module as much as possible.

In the present invention, it is proposed that the first data and an error correction code of the first data are recorded in the first recording area, the second data and an error correction code of the second data are recorded in the second recording area, the error correction codes included in the first recording area and the second recording area are Reed-Solomon codes, a format information recording section that indicates error correction capability of the error correction code of the first data is formed by the coloration pattern of the first modules, and the error correction code of the second data has the same error correction capability as the error correction code of the first data.

In such a configuration, the error correction capability of the error correction code of the second data does not have to be recorded separately. Therefore, a larger volume of the second data can be recorded by the second modules.

In the present invention, it is proposed that the second data is encrypted. In such a configuration, it is possible to increase confidentiality of the second data.

In the present invention, it is proposed that the second data includes an electronic signature that is created at least from the first data, and a public key ID with which a public key certificate can be specified is recorded, the public key certificate including a public key capable of decoding the electronic signature.

In such a configuration, the public key certificate itself is not recorded in the two-dimensional symbol. However, based on the public key ID recorded in the two-dimensional symbol, a person who reads the two-dimensional symbol can specify the public key certificate of a person who signs the electronic signature of the two-dimensional symbol. Therefore, the person who reads the two-dimensional symbol can authenticate the creator of the two-dimensional symbol and confirm presence or absence of falsification of the first data.

In the present invention, it is proposed that the first modules form the finder pattern, the timing pattern, and the first recording area by a pattern of modules colored in a light color and modules colored in a dark color, that the second modules form the second recording area by a pattern of modules colored in the light color and modules colored in the dark color, that at least some of the first modules and the second modules are multivalued modules, each of which is colored to selectively have one of three or more types of light reflective properties, and that a third recording area where third data can be recorded is formed by a coloration pattern of the multivalued modules. Here, the light reflection properties according to the present invention include an invisible light reflective property.

In such a configuration, since the first module and/or the second module are used as the multivalued module, an even larger volume of the data can be recorded in the two-dimensional symbol.

As a method for reading a two-dimensional symbol in the present invention, the method for reading including the following steps is proposed: an imaging step to capture an image of the two-dimensional symbol; a first decoding step to determine the coloration pattern of the first modules in the first recording area on the basis of the image captured in the imaging step and decode the first data; a second decoding step to determine the coloration pattern of the second modules in the second recording area on the basis of the image captured in the imaging step and decode the second data; and a data processing step to execute processing that associates the first data and the second data with each other.

According to such a reading method, a variety of reading methods can be implemented by executing the processing that associates the first data and the second data with each other.

As a method for reading a two-dimensional symbol in the present invention, a method for reading including the following steps is proposed: an imaging step to capture an image of the two-dimensional symbol; a first decoding step to determine the coloration pattern of the first modules in the first recording area on the basis of the image captured in the imaging step and decode the first data; and a second decoding step to determine the coloration pattern of the second modules in the second recording area on the basis of the image captured in the imaging step and decode the second data. In the first decoding step, the center position of the first modules in the image is specified on the basis of the finder pattern and the timing pattern that are included in the image captured in the imaging step. In the second decoding step, the intermediate point between the adjacent first modules in the image is specified on the basis of the center position of the first modules specified in the first decoding step, and a color of the second module is identified on the basis of a color near the intermediate point.

According to such a reading method, a portion in which the color of the second module is identified can easily be specified on the basis of the center position of the first modules that is specified from the finder pattern and the like. Therefore, processing on color identification of the second module is facilitated.

As a method for reading a two-dimensional symbol in the present invention, a method for reading including the following steps is also proposed: an imaging step to capture an image of the two-dimensional symbol; a decoding step to decode the first data, the electronic signature, and the public key ID that are recorded in the two-dimensional symbol on the basis of the image captured in the imaging step; a certificate specifying step to specify the public key certificate on the basis of the public key ID read in the decoding step; a verification step to verify the electronic signature read in the decoding step on the basis of the public key certificate; and a data output step to output the first data read in the decoding step in the case where it is determined in the verification step that the electronic signature is normal.

According to such a reading method, it is possible to confirm absence of falsification of the first data recorded in the two-dimensional symbol, the creator of the two-dimensional symbol, and the like on the basis of the second data.

A method for reading the two-dimensional symbol in the present invention, in which predetermined data and an error correction code of the predetermined data are recorded in duplicate in the first recording area, the second recording area, and the third recording area is proposed, and includes: a first reading step to identify a light/dark pattern of the first modules to read the predetermined data and the error correction code recorded in the first recording area; a first error correction step to verify presence or absence of an error in the read predetermined data on the basis of the error correction code read in the first reading step and correct the error when the error is detected; a second reading step to identify a light/dark pattern of the second modules to read the predetermined data and the error correction code recorded in the second recording area; a second error correction step to verify presence or absence of an error in the read predetermined data on the basis of the error correction code read in the second reading step and correct the error when the error is detected; a third reading step to identify a light reflective property other than that of a light/dark pattern of the multivalued modules to read the predetermined data and the error correction code recorded in the third recording area; a third error correction step to verify presence or absence of an error in the read predetermined data on the basis of the error correction code read in the third reading step and correct the error when the error is detected; a fourth error correction step to correct an error through majority vote of three sets of bit data for three sets of the predetermined data and the error correction code read in the first reading step, the second reading step, and the third reading step; and a fifth error correction step to verify presence or absence of an error in the predetermined data, which is corrected in the fourth error correction step, on the basis of the error correction code, which is corrected in the fourth error correction step, and correct the error when the error is detected. In the case where the correction of the error in the predetermined data fails in the first error correction step, the second error correction step, and the third error correction step, the fourth error correction step and the fifth error correction step are executed.

According to such a reading method, since the error in the data in the two-dimensional symbol can be corrected in multi-layered fashion, the data can reliably be read. In addition, in general, the error correction codeword, such as the Reed-Solomon code, that is recorded in the two-dimensional symbol excels in correcting a burst error, but has low correction capability for a random error. On the contrary, the fourth error correction step to correct the error through the majority vote of the three sets of the bit data excels in correcting the random error. Therefore, according to such a reading method, both of the burst error and the random error can reliably be corrected.

Advantageous Effects of Invention

As it has been described so far, according to the present invention, in the two-dimensional symbol provided with the area where the normal data is recorded and the area where the additional data is recorded, it is possible to easily identify the color of each of the areas for recording the data.

BRIEF DESCRIPTION OF DRAWINGS

FIG. 4A is an explanatory table illustrating data to be recorded in the two-dimensional symbol 1 in the first example, FIG. 4B is an explanatory table illustrating data to be recorded in a two-dimensional symbol 1e of a fifth example, FIG. 4C is an explanatory table illustrating data to be recorded in a two-dimensional symbol of a sixth example, and FIG. 4D is an explanatory table illustrating data to be recorded in a two-dimensional symbol of a seventh example.

FIG. 6A is an explanatory view illustrating an arrangement mode of the reduced basic modules 2b in the encoded area 8 of the two-dimensional symbol 1 in the first example, and FIG. 6B is explanatory view illustrating an arrangement mode of the reduced basic modules 2b and the additional modules 3 in the encoded area 8 of a two-dimensional symbol 1c in a third example.

DESCRIPTION OF EMBODIMENTS

A description will hereinafter be made on an embodiment of the present invention with reference to the following examples. In the following examples, the first modules according to the present invention corresponds to basic modules 2a, 2b, and the second module according to the present invention corresponds to an additional module 3. The format information recording section according to the present invention corresponds to a format information code area 16.

FIRST EXAMPLE

Figure 1:
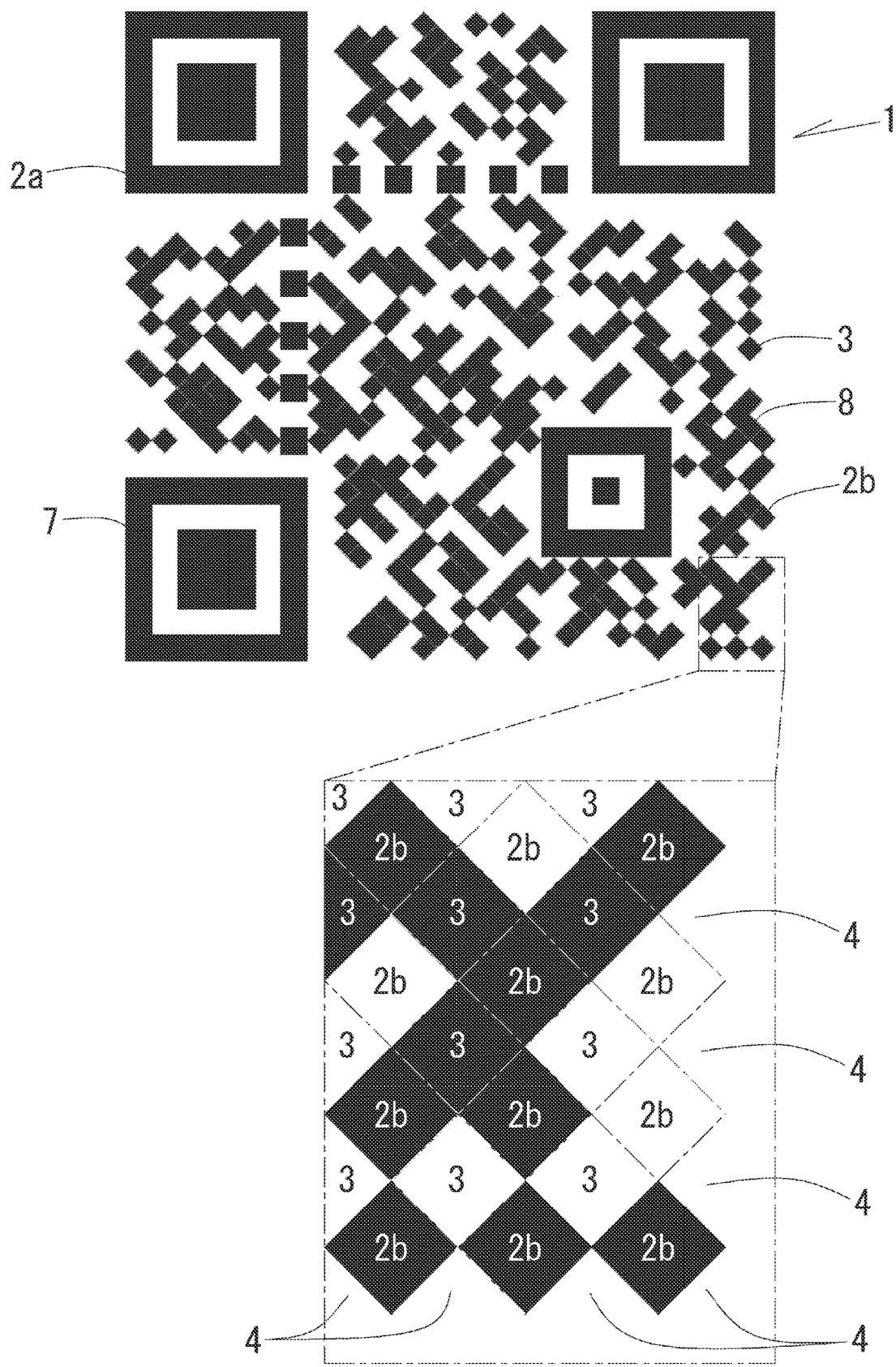
FIG. 1 illustrates a two-dimensional symbol 1 of a first example.

FIG. 1 illustrates a two-dimensional symbol 1 in this example. Such a two-dimensional symbol 1 is compatible with a standardized QR code 1a illustrated in FIG. 2A. In detail, text data of "Diamond Symbol" is recorded in the QR code 1a illustrated in FIG. 2A. When the QR code 1a is read by a QR code reader, a mobile terminal in which a QR code reading program is installed, or the like, the text data is decoded. Also, in the two-dimensional symbol 1 in this example, the same text data as the text data in the QR code 1a is recorded in the same format as the format for the QR code 1a. When the two-dimensional symbol 1 is read by a QR code reader, the mobile terminal in which the QR code reading program is installed, or the like, the two-dimensional symbol 1 is recognized in a similar manner to the QR code 1a, and the text data is decoded.

Figure 2A:
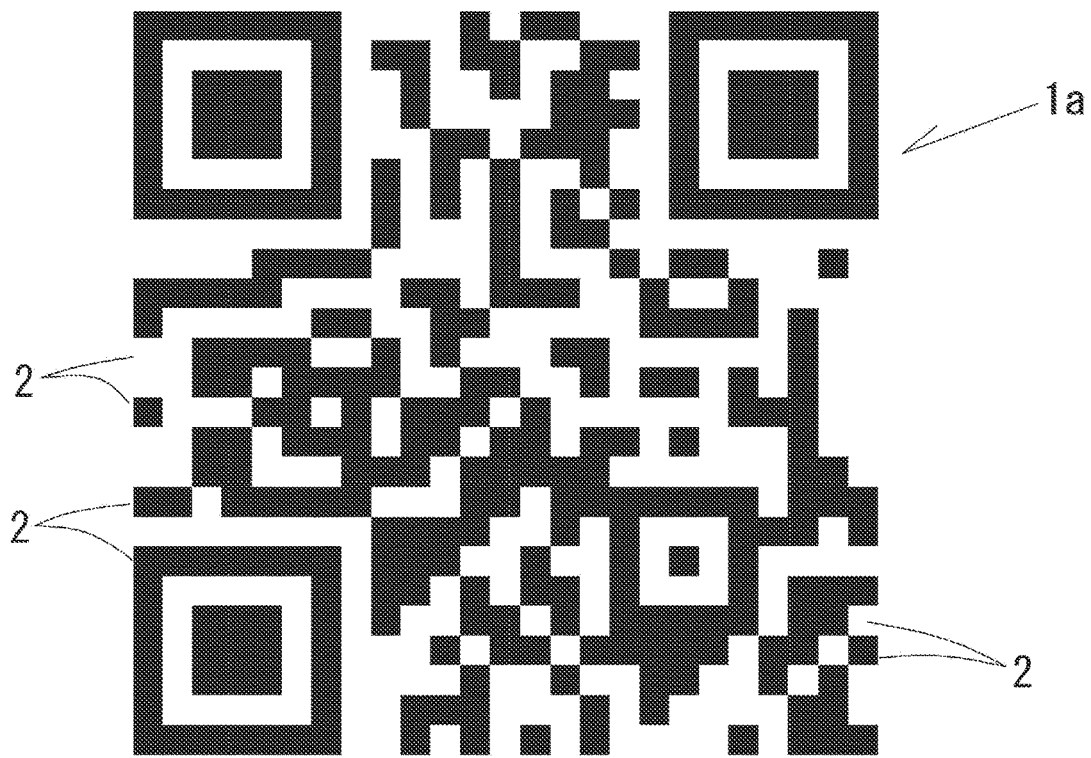
FIG. 2A illustrates a QR code 1a that is compatible with the two-dimensional symbol 1 in FIG. 1.
Figure 2B:
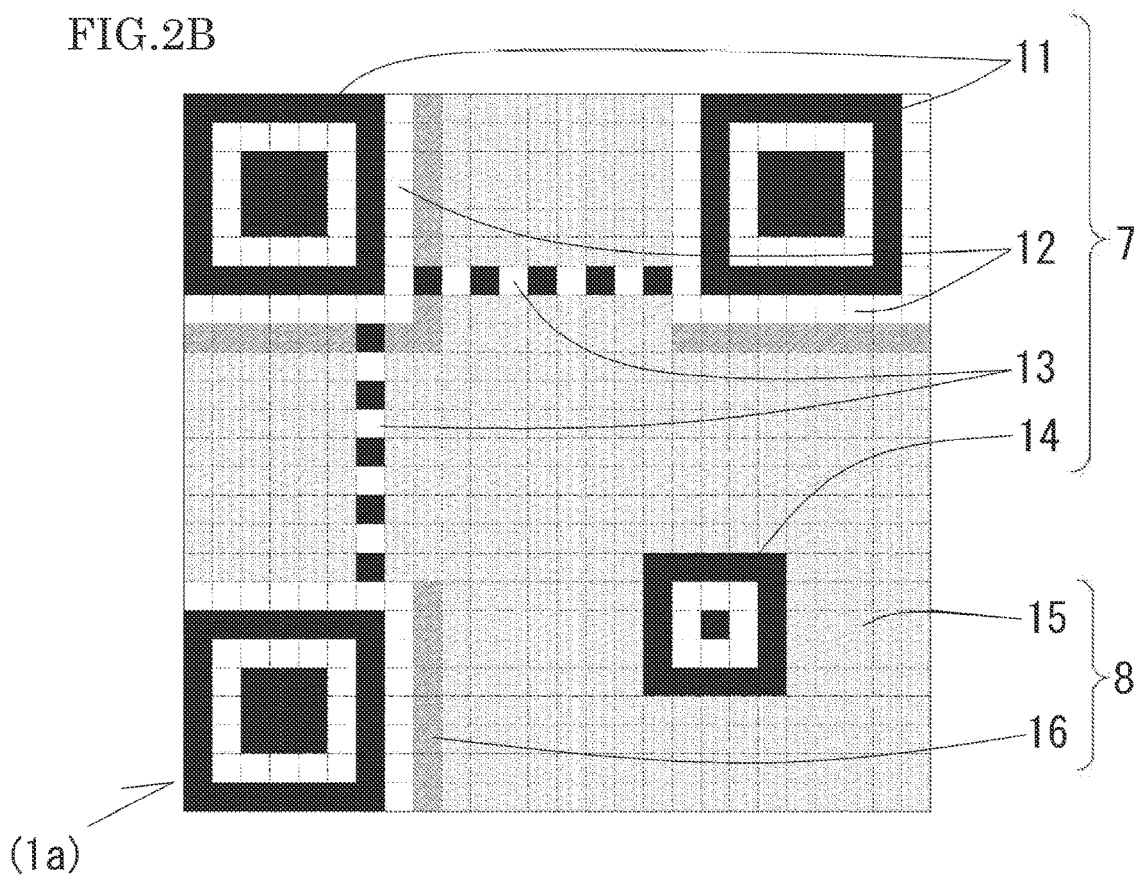
FIG. 2B is an explanatory view illustrating areas of the QR code 1a and the two-dimensional symbol 1 that are divided into patterns by function.

In order to facilitate understanding of a configuration of the two-dimensional symbol 1 in this first example, a description will firstly be made on a configuration of the QR code 1a illustrated in FIG. 2A. Such a QR code 1a has 25 square modules 2 per row and per column, and these modules 2 are arranged in a matrix. Each of the modules 2 is colored in either a light color (white) or a dark color (black). As illustrated in FIG. 2B, the QR code 1a is largely divided into two areas of a function pattern 7 and an encoded area 8. The function pattern 7 is an area where a coloration pattern of the modules 2 is defined in advance, and includes a finder pattern 11 that assists in optical reading of the QR code 1a, a separation pattern 12, a timing pattern 13, an alignment pattern 14, and the like. The finder pattern 11 is a concentric square pattern that is provided at each of three corners of the symbol. By such a pattern, the symbol can easily be detected in an image capturing the QR code 1a. The separation pattern 12 is a pattern of the light modules 2 for surrounding the finder pattern 11. Such a pattern can separate the finder pattern 11 from the surroundings for identification. The timing pattern 13 is a pattern that is provided in one row and one column and in which the light and dark modules 2 are alternately arranged. By such a pattern, center coordinates of each of the modules 2 can be specified in the image capturing the QR code 1a. The alignment pattern 14 is a concentric square pattern that is provided in a lower right portion of the symbol. By such a pattern, distortion of the symbol in the image capturing the QR code 1a can be corrected.

The encoded area 8 is an area where data is recorded according to the coloration pattern of the modules 2, and includes a data code area 15 and the format information code area 16. In the data code area 15, a codeword is provided with 8 bits as one word. The codewords include: a data codeword for recording the data; an error correction codeword for correcting an error in the data codeword; and a pad codeword that pads a remaining area in the data code area 15. In the format information code area 16, format information and model number information of the QR code 1a are recorded. The format information includes an error correction level of the QR code 1a. Since these configurations comply with JIS standards for the QR code (JIS X 0510:2018), a detailed description thereon will not be made.

As illustrated in FIG. 1, the two-dimensional symbol 1 in this example includes two types of modules that are the basic modules 2a, 2b and the additional modules 3. The basic modules 2a, 2b are modules that secure compatibility with the QR code 1a. In order to secure the compatibility with the QR code 1a, similar to the modules 2 in the QR code 1a, 25 each of the basic modules 2a, 2b are arranged per row and per column at equally-spaced intervals in the matrix, and are colored in the light color (white) or the dark color (black) in the same pattern as the pattern of the modules 2 in the QR code 1a. In other words, when the two-dimensional symbol 1 in FIG. 1 is adjusted to the same size as the QR code 1a in FIG. 2B and made to overlap the QR code 1a, the light basic modules 2a, 2b overlap the light modules 2 in a manner that centers of the light basic modules 2a, 2b match centers of the respective light modules 2, and the dark basic modules 2a, 2b overlap the dark modules 2 in a manner that centers of the dark basic modules 2a, 2b match centers of the respective dark modules 2.

Just as described, since the basic modules 2a, 2b are arranged in accordance with the QR code standard to secure the compatibility with the QR code 1a, in the area of the QR code 1a that serves as the function pattern, the coloration pattern of the basic modules 2a is fixed, and the finder pattern 11, the separation pattern 12, the timing pattern 13, and the alignment pattern 14 are formed by the basic modules 2a (see FIG. 2). Similarly, in the area of the QR code 1a that serves as the encoded area, the encoded area 8 including the data code area 15 and the format information code area 16 are formed by the coloration pattern of the basic modules 2b.

Figure 3A:
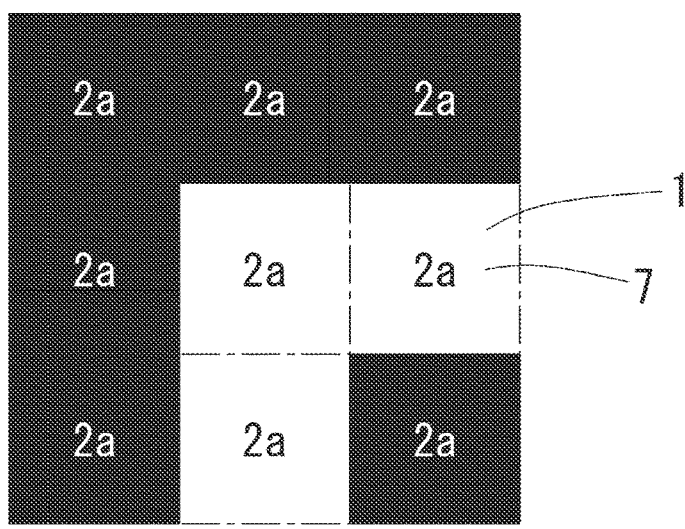
FIG. 3A is an explanatory view illustrating an arrangement mode of normal basic modules 2a in a function pattern 7 of the two-dimensional symbol 1.
Figure 3B:
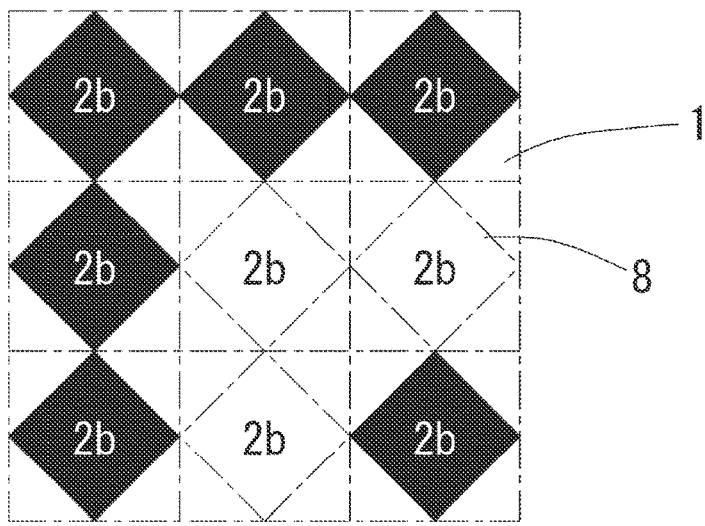
FIG. 3B is explanatory view illustrating an arrangement mode of reduced basic modules 2b in an encoded area 8 of the two-dimensional symbol 1.
Figure 3C:
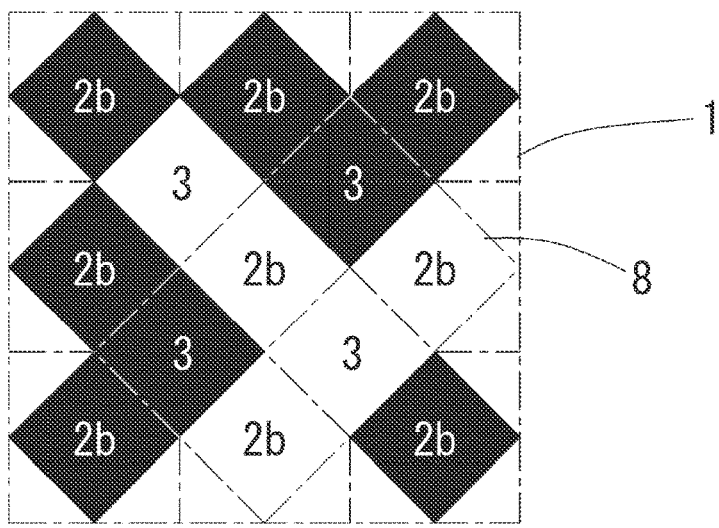
FIG. 3C is an explanatory view illustrating an arrangement mode of the reduced basic modules 2b and additional modules 3 in the encoded area 8 of the two-dimensional symbol 1.

In the two-dimensional symbol 1 of this first example, a clearance is provided between some of the basic modules 2b, and the additional module 3 is disposed in the clearance. In detail, the basic modules 2a, 2b are the normal basic module 2a and the reduced basic module 2b that is smaller than the normal basic module 2a. Similar to the module 2 in the QR code 1a, the normal basic module 2a has a square shape in which each side is equal to an arrangement interval of the basic modules 2a, 2b. As illustrated in FIG. 3A, the normal basic modules 2a are arranged without any clearance in the function pattern 7. Meanwhile, the reduced basic module 2b has a square shape whose area is half an area of the normal basic module 2a. As illustrated in FIG. 3B, in the encoded area 8, the reduced basic module 2b is arranged in a state of being inclined at 45° with respect to an arrangement direction of the basic modules 2a, 2b. In addition, the normal basic modules 2a and the reduced basic modules 2b are arranged vertically and horizontally such that center portions of all the basic modules 2a, 2b are arranged vertically and horizontally at regular arrangement intervals. In this way, in this example, the reduced basic modules 2b are arranged in the encoded area 8. Thus, a square clearance in the same size as the reduced basic module 2b is generated between the diagonally-adjacent reduced basic modules 2b, 2b, and the additional module 3 is provided in each of such clearances. In the two-dimensional symbol 1 in this example, such additional modules 3 are colored in the light color (white) or the dark color (black) in a pattern independent of the reduced basic modules 2b. Accordingly, by such a light/dark pattern, additional data, which is not recorded in the QR code 1a, can be recorded in the two-dimensional symbol 1.

As described above, the two-dimensional symbol 1 in this example is equipped with: a first recording area where data decodable by a method for reading the QR code 1a (hereinafter referred to as compatible data) can be recorded by the light/dark pattern of the reduced basic modules 2b in the encoded area 8; and a second recording area where the additional data, which cannot be decoded by the method for reading the QR code 1a, can be recorded by the light/dark pattern of the additional modules 3. As illustrated in FIG. 1, in this example, since the reduced basic modules 2b and the additional modules 3 are provided in a ratio of 1 to 1 in the encoded area 8, recording capacities of the first recording area and the second recording area are substantially the same. However, strictly speaking, since the additional modules 3 are not disposed in an outer peripheral portion of the two-dimensional symbol 1 and a boundary portion between the encoded area 8 and the function pattern 7, the larger number of the reduced basic modules 2b than the additional modules 3 is provided, and the recording capacity of the first recording area is slightly larger than the recording capacity of the second recording area.

FIG. 4A illustrates data to be recorded in the two-dimensional symbol 1. As described above, in this example, the data codeword for recording the compatible data ("Diamond Symbol") and the error correction codeword for correcting an error in the compatible data are recorded in the first recording area. These data codeword and error correction codeword are recorded in accordance with the QR code standard. The error correction codeword is a Reed-Solomon code, and an error correction capability (an error correction level) thereof is recorded in the format information code area 16. Meanwhile, in this example, a name (text data of "teraura") of a creator of the two-dimensional symbol 1 is recorded as the additional data in the second recording area. In this example, in order to enhance confidentiality, the additional data is recorded in an encrypted state with a predetermined common key.

In the second recording area, in addition to the data codeword for recording the additional data, the error correction codeword for correcting the error in the additional data is recorded. As such an error correction codeword, an error correction code (the Reed-Solomon code) in the same form as the error correction codeword recorded in the first recording area is used. In addition, such an error correction codeword has the same error correction capability (error correction level). Just as described, in the case where the form and the correction capability of the error correction codeword recorded in the second recording area are shared with those of the error correction codeword recorded in the first recording area, the error correction level, which is recorded in the format information code area 16 by the coloration patterns of the basic modules 2a, 2b, can be used. As a result, an additional error correction level does not have to be recorded in the second recording area, which can increase a volume of other types of data to be recorded in the second recording area.

The two-dimensional symbol 1 in this example can be created by a creation method including the following steps (1) to (5), for example.

(1) Preparation of Recording Data

The compatible data (the text data of "Diamond Symbol") to be recorded in the first recording area and the additional data (the text data of "teraura") to be recorded in the second recording area are prepared.

(2) Determination of Coloration Patterns of Basic Modules

Bit data on the light/dark patterns of the basic modules 2a, 2b in the two-dimensional symbol 1 is generated. In other words, the light/dark pattern of the reduced basic modules 2b in the encoded area 8 for recording the compatible data ("Diamond Symbol") is determined and combined with the light/dark pattern of the normal basic modules 2a in the function pattern 7. As described above, the light/dark patterns of the basic modules 2a, 2b are the same as the light/dark patterns of the modules in the compatible QR code 1a. Accordingly, such a step can be executed in a similar manner to a method for determining the light/dark pattern of the modules in the known creation method for the QR code.

(3) Determination of Coloration Pattern of Additional Modules

Bit data on the light/dark pattern of the additional modules 3 in the two-dimensional symbol 1 is generated. In other words, the additional data ("teraura") is encrypted with the predetermined common key. The data codeword for recording the encrypted data and the error correction codeword thereof are generated. Then, the bit data on the light/dark pattern of the additional modules 3 is generated.

(4) Creation of Image Data

Image data of the two-dimensional symbol 1 is created. More specifically, first, based on the bit data generated in step (2), image data in which the black basic modules 2a, 2b are arranged on a white background is created. Here, the normal basic modules 2a are arranged in the function pattern 7, and the reduced basic modules 2b are arranged in the encoded area 8. Next, based on the bit data created in (3), the black additional modules 3 are arranged in the image data to obtain an image of the two-dimensional symbol 1.

(5) Output

The created image data of the two-dimensional symbol 1 is output. More specifically, the image data of the two-dimensional symbol 1 is printed on an object such as a packaging box or shown on a display of the mobile terminal or the like.

The two-dimensional symbol 1 in this example is compatible with the QR code 1a. Thus, when the two-dimensional symbol 1 is read by using the QR code reader or the mobile terminal in which the QR code reading program is installed, the two-dimensional symbol 1 is recognized as the QR code, and the compatible data ("Diamond Symbol") recorded in the first recording area is decoded. Meanwhile, when the two-dimensional symbol 1 in this example is read by using a dedicated reader or a mobile terminal in which a dedicated reading program is installed, in addition to the compatible data recorded in the first recording area, the additional data ("teraura") recorded in the second recording area is decoded.

For example, the compatible data and the additional data in the two-dimensional symbol 1 in this example can be decoded by sequentially executing the following steps (1) to (4) using the dedicated reader. Such a reading method can also be executed by the mobile terminal in which the dedicated reading program is installed. The first decoding step according to the present invention corresponds to (2) compatible data decoding processing, which will be below, and the second decoding step according to the present invention corresponds to (3) additional data decoding processing, which will be below.

(1) Imaging Processing

An image including the two-dimensional symbol 1 is captured by using a camera. The camera may be built into the reader, or may externally be connected to the reader.

(2) Compatible Data Decoding Processing

The dedicated reader decodes the compatible data by the following procedure [2a] to [2d]. Such a procedure is a similar procedure to a known method for reading a QR code.

[2a]

In the captured two-dimensional symbol 1, a position of the two-dimensional symbol 1 is detected on the basis of the finder patterns 11.

[2b]

The distortion of the two-dimensional symbol 1 in the image is corrected by the alignment pattern 14. Then, the center coordinates of the reduced basic module 2b in the image are determined by the timing pattern 13.

[2c]

Based on a color of a pixel in the center portion of each of the basic modules 2a, 2b in the image, it is determined whether each of the reduced basic modules 2b is in either the light color or the dark color. Then, the bit data on the light/dark pattern is generated.

[2d]

Mask pattern processing is executed on the generated bit data. Thereafter, based on the error correction codeword, detection and correction of the error are attempted to decode the compatible data. In the case where the detected error cannot be corrected, the processing is executed again from step (1).

(3) Additional Data Decoding Processing

The dedicated reader decodes the additional data by the following procedure [3a] to [3d].

[3a]

Based on the center coordinates of the reduced basic module 2b, which are determined in above step [2b], center coordinates of the additional module 3 are determined. In this example, an intermediate point between the diagonally-adjacent reduced basic modules 2b corresponds to the center coordinates of the additional module 3. Thus, the center coordinates of the additional module 3 can easily be determined from the center coordinates of the diagonally-adjacent reduced basic modules 2b. Here, the center coordinates of the additional module 3 can be calculated from the center coordinates of the two reduced basic modules 2b, which are located on an upper right side and a lower left side or on an upper left side and a lower right side of the additional modules 3. However, the center coordinates of the additional module 3 may be calculated from the four center coordinates located on the upper right side, the lower left side, the upper left side, and the lower right side of the additional module 3.

[3b]

Based on a color of a pixel in a center portion of the additional module 3 in the image, it is determined whether the additional module 3 is in either the light color or the dark color. Then, the bit data on the light/dark pattern is generated.

[3c]

Based on the error correction codeword included in the generated bit data, detection and correction of the error are attempted. In the case where the detected error cannot be corrected, the processing is executed again from step (1).

[3d]

The data recorded in the data codeword is decoded with the common key, which is stored in the reader in advance, to decode the additional data ("teraura").

(4) Output Processing

The data decoded from the first recording area and the second recording area is output. More specifically, the decoded data is shown on the display of the reader or output to an external device.

As it has been described so far, similar to the modules 2 of the QR code la, the two-dimensional symbol 1 in this example includes: the basic modules 2a, 2b, each of which is arranged at the regular intervals in the matrix; and the additional modules 3, each of which is provided between the basic modules 2b. The compatible data, which can be read by the method for reading the QR code, is recorded by the light/dark pattern of the basic modules 2b, and the additional data, which cannot be read by the method for reading the QR code, is recorded by the light/dark pattern of the additional modules 3.

In this example, the additional module 3 is arranged not to overlap the reduced basic module 2b by avoiding a center point of the reduced basic module 2b. Thus, when the two-dimensional symbol 1 is read by the method for reading the QR code, the light/dark pattern of the reduced basic modules 2b is identified without an influence of the additional modules 3, and thus the compatible data is decoded. In addition, the additional data can be decoded by identifying the light/dark pattern of the additional modules 3 in the two-dimensional symbol 1 using the above reading method or the like. Here, in this example, the additional module 3 is provided in the clearance between the reduced basic modules 2b so as to include the intermediate point between the adjacent reduced basic modules 2b. Thus, the additional module 3 has greater freedom in the size and the shape than a case of subdividing the square module. Accordingly, in this example, in the encoded area 8, the additional module 3 is formed in the square shape having the same size as the reduced basic module 2b, and the reduced basic modules 2b and the additional modules 3 are arranged adjacently without any clearance. In this way, the lightness and the darkness of the reduced basic modules 2b are identified as easily as those of the additional modules, and ease of the identification of the lightness and the darkness of the reduced basic modules 2b and the additional modules 3 can be improved as much as possible. Just as described, in the two-dimensional symbol 1 of this first example, it is possible to improve the ease of the color identification of both of the reduced basic modules 2b for recording the compatible data and the additional modules 3 for recording the additional data while the ease of the color identification of the reduced basic modules 2b and the additional modules 3 is maintained to be equal. Thus, the two-dimensional symbol 1 can be reduced in size.

SECOND EXAMPLE

This example is a modified example of the two-dimensional symbol 1 in the first example. In this example, components other than those described below are the same as the components in the first example. Thus, such components will be denoted by the same reference signs, and a description thereon will not be made.

Figure 5:
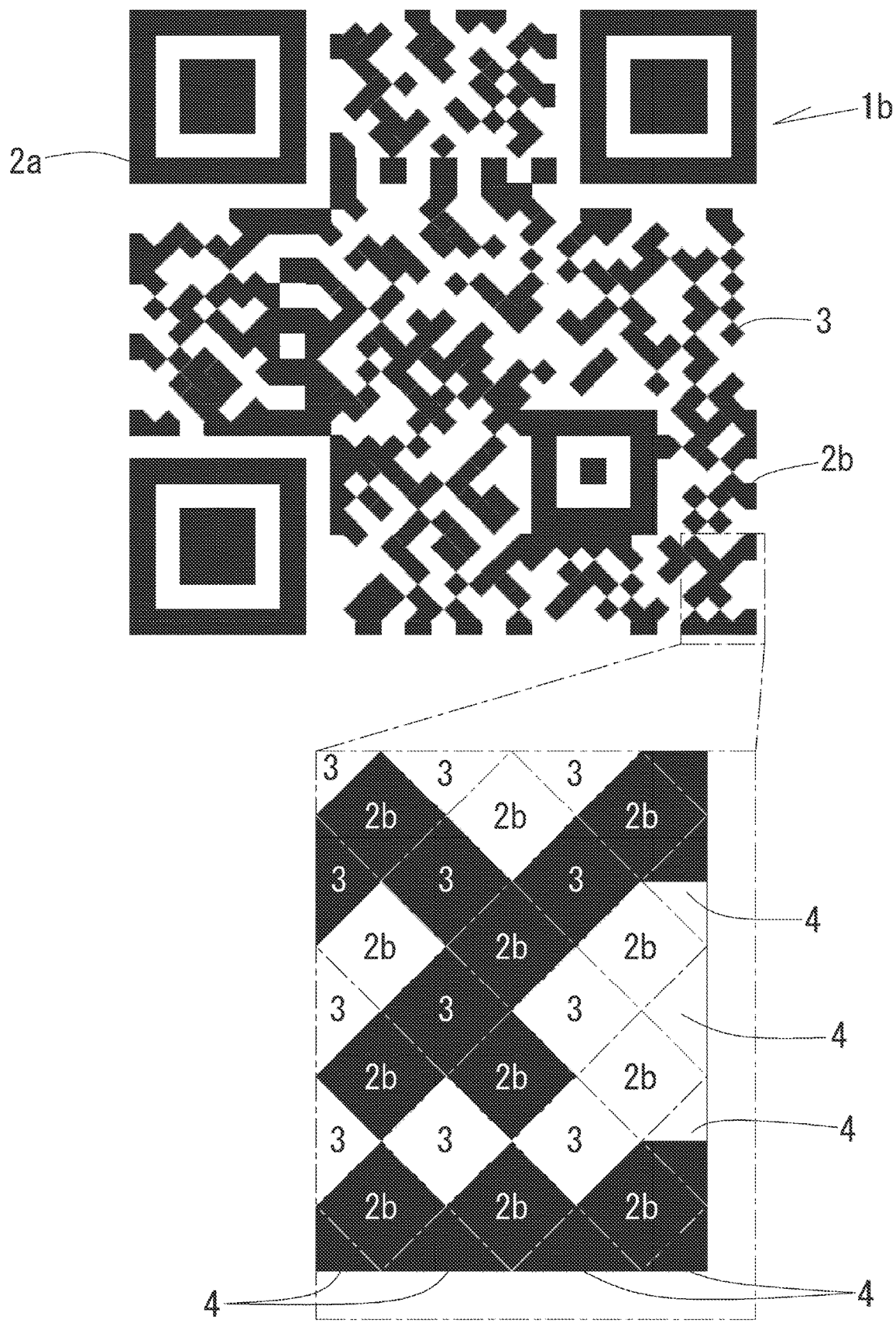
FIG. 5 illustrates a two-dimensional symbol 1b in a second example.

As described above, in the encoded area 8 according to the first example, the additional module 3 is provided between the adjacent reduced basic modules 2b. For this reason, a triangular surplus area 4 that constitutes none of the modules 2b, 3 is formed in the boundary portion between the function pattern 7 and the encoded area 8 and an outer peripheral portion of the two-dimensional symbol 1 (see FIG. 1). In addition, in the first example, all the surplus areas 4 are colored in white. Meanwhile, in a two-dimensional symbol 1b in this example, as illustrated in FIG. 5, such a surplus area 4 is colored in the light color or the dark color on the basis of the color of the reduced basic module 2b near the surplus area 4. Just as described, by coloring the surplus area 4 in the color of the reduced basic module 2b near the surplus area 4, it is possible to improve accuracy of identification of the color of the reduced basic module 2b in the boundary portion between the function pattern 7 and the encoded area 8 and in the outer peripheral portion of the two-dimensional symbol 1b. Such a two-dimensional symbol 1b can be created by first creating the image data of the QR code 1a (see FIG. 2A), in which the compatible data ("Diamond Symbol") is recorded, in accordance with a known method for generating a QR code and by thereafter drawing the white and black additional modules 3 on the image data of the QR code 1a. Just as described, the surplus areas 4 that are generated in the boundary portion between the function pattern 7 and the encoded area 8 and in the outer peripheral portion of the two-dimensional symbol 1 can be colored in any color. For this reason, further data may be recorded by a coloration pattern of such a surplus area 4.

THIRD EXAMPLE

This example is a modified example of the two-dimensional symbol 1 in the first example. In this example, components other than those described below are the same as the components in the first example. Thus, such components will be denoted by the same reference signs, and a description thereon will not be made.

In this example, the shapes of the reduced basic module 2b and the additional module 3 are changed from the square shapes in the first example (see FIG. 6A) to circular shapes (see FIG. 6B). A diameter of each of the reduced basic module 2b and the additional module 3 according to this example is $1/\sqrt{2}$ of the arrangement interval of the basic modules 2a, 2b. In the encoded area 8, the diagonally-adjacent reduced basic module 2b are in contact with the additional module 3.

Also, in this example, the reduced basic module 2b for recording the compatible data and the additional module 3 for recording the additional data have the circular shapes in the same size. Thus, the ease of the color identification of the reduced basic module 2b and the ease of the color identification of the additional module 3 are equal to each other. Therefore, in a two-dimensional symbol 1d in this example, the ease of the color identification of the modules is improved as a whole, and thus the two-dimensional symbol 1d can be downsized.

The areas of the reduced basic module 2b and the additional module 3 according to this example are smaller than those in the first example. However, the ease of the color identification is the same as that in the first example. This is because the color of each of the modules 2b, 3 is identified by the color of the pixel in the center portion of respective one of the modules 2b, 3 extracted from the captured image, and thus the ease of the color identification of each of the modules 2b, 3 depends on a size of a circle that can be included in respective one of the modules 2b, 3 rather than the area of respective one of the modules 2b, 3.

Just as described, in the present invention, each of the reduced basic module 2b and the additional module 3 is not limited to have the square shape, and the sizes and the shapes of the reduced basic module 2b and the additional module 3 can be changed to any of various sizes and shapes. In this example, the reduced basic module 2b and the additional module 3 have the same area and the same shape. However, in the embodiment of the present invention, the sizes and the shapes of the reduced basic module 2b and the additional module 3 may not be the same. More specifically, the reduced basic module 2b can have the square shape and the size in the first example, and the additional module 3 can have the circular shape and the size in this example.

In addition, in the above example, similar to the first example, the normal basic module 2a is disposed in the function pattern 7. However, in the partial or entire function pattern 7, the normal basic module 2a may be changed to the reduced basic module 2b. In addition, in the function pattern 7, the additional module 3 may be disposed in the clearance between the adjacent reduced basic modules 2b. Furthermore, the reduced basic module 2b may be changed to the normal basic module 2a in a part of the encoded area 8, and the additional module 3 may be disposed only in the part of the encoded area 8.

FOURTH EXAMPLE

This example is a modified example of the two-dimensional symbol 1 in the first example. In this example, components other than those described below are the same as the components in the first example. Thus, such components will be denoted by the same reference signs, and a description thereon will not be made.

Figure 7A:
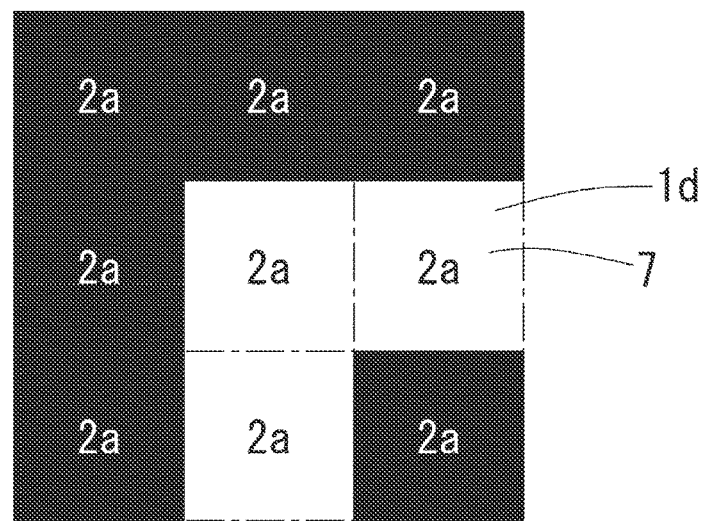
FIG. 7A is an explanatory view illustrating an arrangement mode of the normal basic modules 2a in the function pattern 7 of a two-dimensional symbol 1d in a fourth example.
Figure 7B:
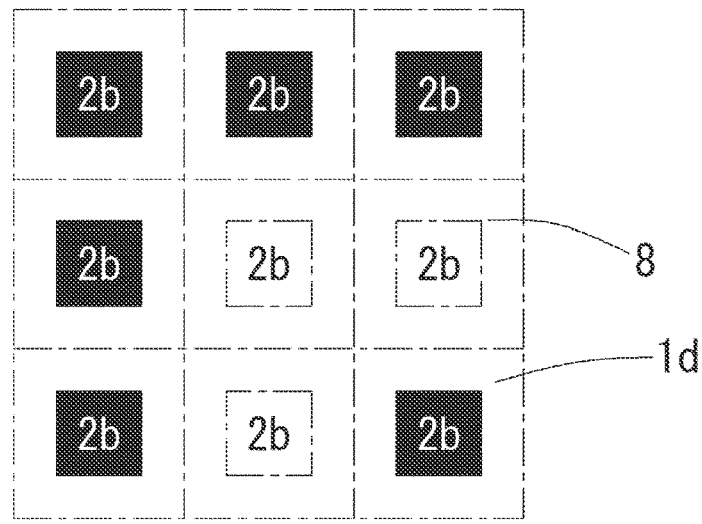
FIG. 7B is explanatory view illustrating an arrangement mode of the reduced basic modules 2b in the encoded area 8 of the two-dimensional symbol 1d in the fourth example.
Figure 7C:
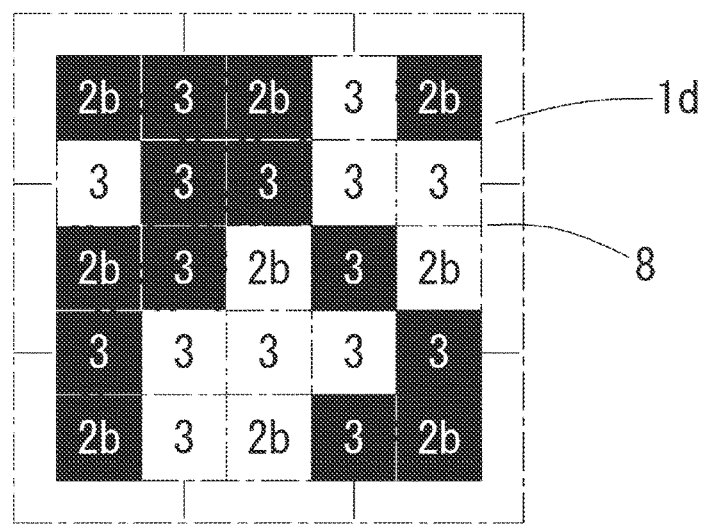
FIG. 7C is an explanatory view illustrating an arrangement mode of the reduced basic modules 2b and the additional modules 3 in the encoded area 8 of the two-dimensional symbol 1d in the fourth example.

In this example, the additional module 3 is disposed between the vertically-adjacent, horizontally-adjacent, or diagonally-adjacent adjacent reduced basic modules 2b. In detail, in the two-dimensional symbol 1d in this example, similar to the first example, the square normal basic modules 2a are arranged in the function pattern 7 without any clearance (see FIG. 7A). Meanwhile, as illustrated in FIG. 7B, the square reduced basic module 2b that is smaller than the reduced basic module 2b in the first example and has a quarter of the area of the normal basic module 2a is arranged in the encoded area 8. Such a reduced basic module 2b is not inclined to the arrangement direction of the basic modules 2a, 2b and is arranged in the same orientation as the normal basic module 2a. In addition, the reduced basic module 2b is arranged such that the center portions of all the basic modules 2a, 2b are arranged vertically and horizontally at the regular arrangement intervals. In this way, in this example, the reduced basic modules 2b has the square shape and has the quarter of the area of the normal basic module 2a. Thus, as illustrated in FIG. 7B, in the encoded area 8, a clearance is generated between the vertically-adjacent, horizontally-adjacent, or diagonally-adjacent reduced basic modules 2b, 2b, and a square in the same size as the reduced basic module 2b can be arranged in such a clearance. Then, as illustrated in FIG. 7C, in this example, the additional module 3 capable of recording the additional data by the light/dark pattern is provided in each of such clearances.

In the two-dimensional symbol 1d of this example, the reduced basic module 2b for recording the compatible data and the additional module 3 for recording the additional data have the square shapes in the same size. Thus, the ease of the color identification of the reduced basic module 2b and the ease of the color identification of the additional module 3 are equal to each other. Therefore, also in the two-dimensional symbol 1d in this example, the ease of the color identification of the modules is improved as a whole, and thus the two-dimensional symbol 1d can be downsized. In addition, in the two-dimensional symbol 1d in this example, in the encoded area 8, the number of the additional modules 3 that is about three times as many as the number of the reduced basic module 2b is provided, and the capacity of the second recording area is about three times as large as that of the first recording area. Therefore, a larger volume of the additional data than the compatible data can be recorded.

FIFTH EXAMPLE

This example is a modified example of the two-dimensional symbol 1 in the first example. In this example, components other than those described below are the same as the components in the first example. Thus, such components will be denoted by the same reference signs, and a description thereon will not be made.

Figure 8A:
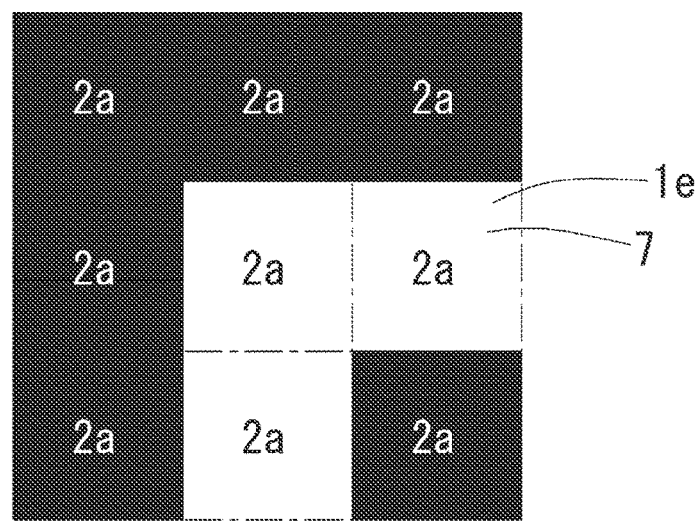
FIG. 8A is an explanatory view illustrating an arrangement mode of the normal basic modules 2a in the function pattern 7 of the two-dimensional symbol 1e in the fifth example.
Figure 8B:
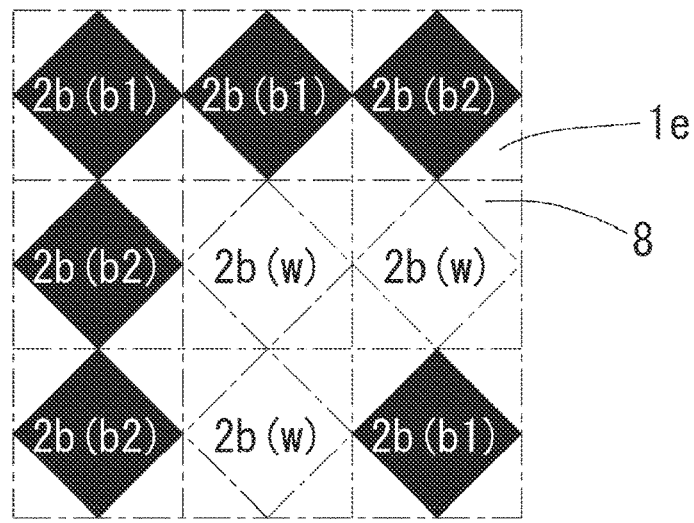
FIG. 8B is explanatory view illustrating an arrangement mode of the reduced basic modules 2b in the encoded area 8 of the two-dimensional symbol 1e in the fifth example.
Figure 8C:
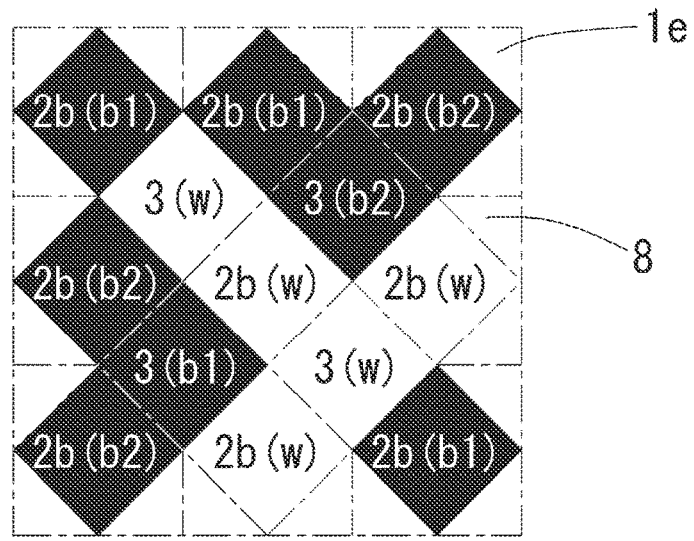
FIG. 8C is an explanatory view illustrating an arrangement mode of the reduced basic modules 2b and the additional modules 3 in the encoded area 8 of the two-dimensional symbol 1e in the fifth example.

In this example, in the configuration in the first example, some of the modules are multivalued modules that are selectively colored in any of three types of colors with different light reflective properties. In this way, confidential data, which can be decoded by a different method from that for the compatible data and the additional data, can be recorded. More specifically, in a two-dimensional symbol 1e in this example, the reduced basic module 2b and the additional module 3 in the encoded area 8 are the multivalued modules. In other words, as illustrated in FIG. 8, in the encoded area 8, the reduced basic modules 2b and the additional modules 3 are colored in three types of white (w), black (b1) reflecting infrared light, and black (b2) absorbing the infrared light. In addition, similar to the first example, the two-dimensional symbol 1e in this example is provided with: the first recording area where the compatible data can be recorded by the light/dark pattern of the reduced basic modules 2b; and the second recording area where the additional data can be recorded by the light/dark pattern of the additional modules 3. Furthermore, in this example, a third recording area capable of recording confidential data is provided by high-low patterns of an infrared light reflection rate of the basic module 2b and the additional module 3. The confidential data cannot be decoded by the method for reading the two-dimensional symbol 1 in the first example. In an image of the two-dimensional symbol 1e captured by the infrared light, in order to facilitate the identification of the function pattern 7, the normal basic modules 2a, which constitutes the function pattern 7, are colored in two types of white (w) and black (b2) absorbing the infrared light.

As illustrated in FIG. 4B, in the two-dimensional symbol 1e in this example, a creation date of the two-dimensional symbol 1d is recorded together with an error correction codeword in the third recording area. Needless to say, in addition to such data, various types of the data can be recorded in the third recording area. A recording capacity of the third recording area varies by the number of the black modules 2b, 3 included in the encoded area 8. However, since a ratio of the light modules and the dark (black) modules is approximately 1 to 1, substantially the same volume of the data as each of the first recording area and the second recording area can be recorded in the third recording area.

In regard to the two-dimensional symbol 1e in this example, when a reader capable of measuring the infrared light reflection rate is used to distinguish between the black (b1) modules 2b, 3 that reflect the infrared light and the black (b2) modules 2b, 3 that absorb the infrared light, the confidential data, which is recorded by the high-low patterns of the infrared light reflection rate of the reduced basic modules 2b and the additional modules 3, can be decoded. In the method for reading a QR code, it is identified whether each of the modules is in the light color or the dark color on the basis of a visible light reflection rate. Accordingly, in the case where the two-dimensional symbol 1e in this example is read by using the QR code reader or the mobile terminal, in which the QR code reading program is installed, both of the black (b1) modules 2b, 3 reflecting the infrared light and the black (b2) modules 2b, 3 absorbing the infrared light are identified to be in the dark color. As a result, only the compatible data recorded in the first recording area is decoded. In addition, also in the method for reading the two-dimensional symbol 1 of the first example, it is only identified whether each of the modules is in the light color or the dark color on the basis of the visible light reflection rate. Accordingly, both of the black (b1) modules 2b, 3 reflecting the infrared light and the black (b2) modules 2b, 3 absorbing the infrared light are identified to be in the dark color. Thus, in the case where the two-dimensional symbol 1e in this example is read by the method for reading the two-dimensional symbol 1 in the first example, the compatible data, which is recorded in the first recording area, and the additional data, which is recorded in the second recording area, are decoded while the confidential data, which is recorded in the third recording area, is not decoded. Just as described, the confidential data, which is recorded in the third recording area of the two-dimensional symbol 1e in this example, can only be read by using the reader capable of measuring the infrared light reflection rate.

Figure 9A:
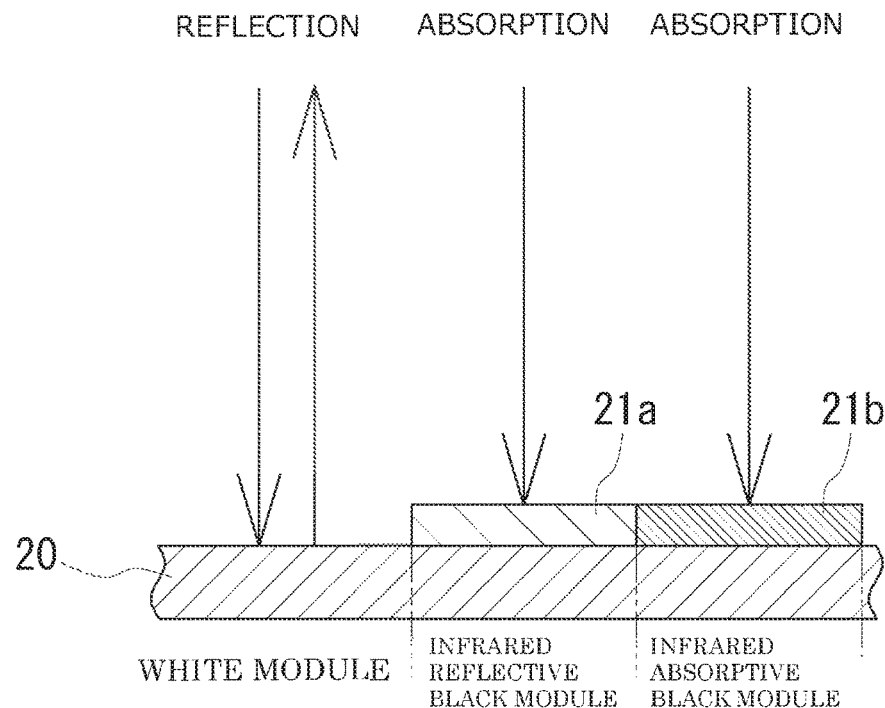
FIG. 9A and FIG. 9B includes explanatory views illustrating a light reflective property of a module in each color in the two-dimensional symbol 1e in the fifth example.
Figure 9B:
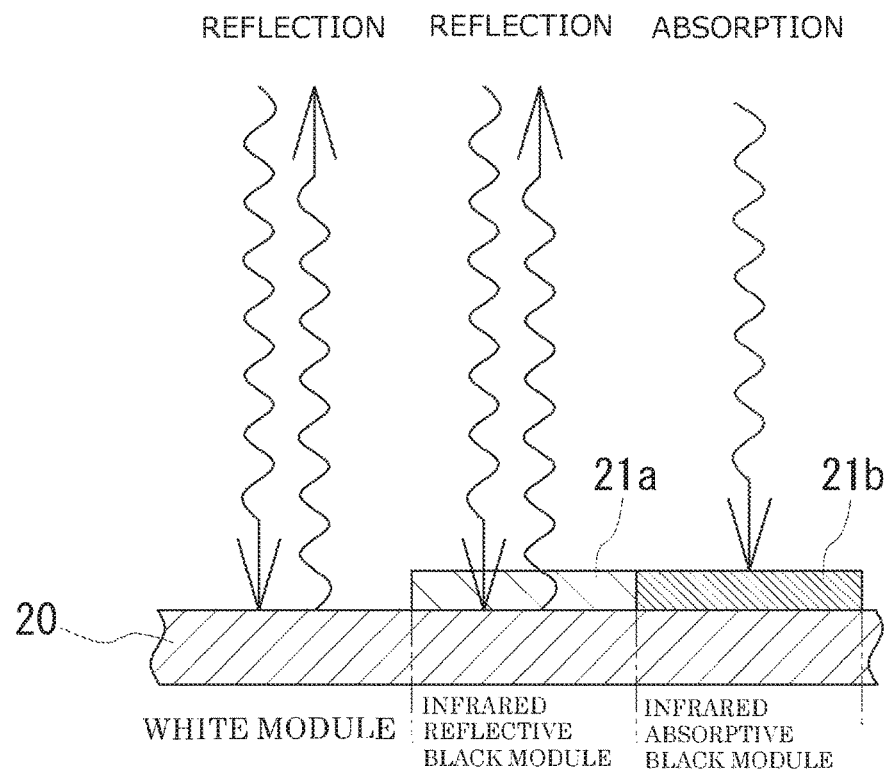

As illustrated in FIG. 9, the two-dimensional symbol 1e in this example is created by forming layers of black inks 21a, 21b on a surface of a white paper base material 20, which constitutes the packaging box or the like, by printing. More specifically, as illustrated in FIG. 9A, a portion in which the layers of the black inks 21a, 21b are not printed and the surface of the paper base material 20 is exposed serves as the white module having the high visible light reflection rate, and a portion formed with the layer of either one of the black inks 21a, 21b serves as the black module with the low visible light reflection rate. As the black inks 21a, 21b, two types of the infrared light-permeable black ink 21a, through which the infrared light passes, and the infrared light-absorbing black ink 21b, which absorbs the infrared light, are used. As illustrated in FIG. 9B, in the portion that is formed with the layer of the infrared light-permeable black ink 21a, the infrared light passes through the ink 21a and is reflected by the paper base material 20 with the high infrared light reflection rate. Thus, such a portion serves as the black module that reflects the infrared light. Meanwhile, in the portion that is formed with the layer of the infrared light-absorbing black ink 21b, the infrared light is absorbed by the ink 21b. Thus, such a portion serves as the black module that absorbs the infrared light. Here, the white paper base material generally has the high infrared light reflection rate, a black dye ink generally passes through the infrared light, and a black pigment ink generally absorbs the infrared light. Thus, the two-dimensional symbol 1e in this example can be created by using generally-used materials.

As it has been described so far, the two-dimensional symbol 1e in this example is provided with the third recording area, where the confidential data is recorded, by the high-low pattern of the infrared light reflection rate. However, in the third recording area according to the present invention, the data may be recorded by a difference in a visible light reflective property regardless of a magnitude of the infrared light reflection rate. For example, it is proposed to color the modules 2*b*, 3 in the encoded area 8 in three types of colors that are white (the light color), navy (the dark color), and black (the dark color) and to provide the third recording area, where the confidential data can be recorded, by a pattern of the navy modules 2*b*, 3 and the black modules 2*b*, 3. In addition, the light modules 2*b*, 3 may be used as the multivalued modules by selectively coloring the light modules 2*b*, 3 in plural colors (white and light gray).

SIXTH EXAMPLE

In this example, the content of the additional data is changed from that in the two-dimensional symbol 1 in the first example. Since the components of the two-dimensional symbol 1 are the same as those in the first example, the components will be denoted by the same reference signs as those in the first example, and the detailed description thereon will not be made.

As illustrated in FIG. 4C, in this example, an electronic signature and a public key ID are recorded as the additional data in the second recording area. The electronic signature is generated from the compatible data (the text data of "Diamond Symbol"), which is recorded in the first recording area, by using a public key of the creator of the two-dimensional symbol 1. The public key ID is used to specify a public key certificate related to a private key that is used by the creator of the two-dimensional symbol 1 to generate the electronic signature.

A structure of the two-dimensional symbol in this example is the same as that in the first example. Thus, when the two-dimensional symbol in this example is read by using the QR code reader, the compatible data (the text data of "Diamond Symbol") recorded in the first recording area is decoded. Meanwhile, in the case where the two-dimensional symbol in this example is read by using the method for reading the two-dimensional symbol 1 in the first example, the compatible data and the additional data are decoded. Accordingly, as a method for reading the two-dimensional symbol in this example, the following method is proposed. In the method, the public key ID and the electronic signature included in the additional data are used to confirm that the creator of the two-dimensional symbol and the compatible data are not falsified, and then the decoded compatible data is output. More specifically, a reading method including the following procedure (1) to (6) will be described. Here, since processing in (1) to (3) below is the same as the processing in (1) to (3) in the above-described method for reading the two-dimensional symbol 1 in the first example, a detailed description thereon will not be made. In the following reading method, the imaging step according to the present invention corresponds to (1) imaging processing, and the decoding step according to the present invention corresponds to (2) the compatible data decoding processing and (3) the additional data decoding processing. In addition, the certificate specifying step according to the present invention corresponds to (4) public key certificate preparation processing. Furthermore, the verification step according to the present invention corresponds to (5) authentication processing. Moreover, the data output step according to the present invention corresponds to (6) output processing.

(1) Imaging Processing
(2) Compatible Data Decoding Processing
(3) Additional Data Decoding Processing
(4) Public Key Certificate Preparation Processing The public key certificate that is linked to the public key ID included in the additional data is prepared. More specifically, based on the public key ID, the mobile terminal that has read the two-dimensional symbol specifies the public key certificate that is linked to the public key ID. In the case where the public key certificate that corresponds to the public key ID is stored in the mobile terminal, the public key certificate is used. On the other hand, in the case where the public key certificate is not stored in the mobile terminal, the public key certificate is acquired from a required server via the Internet.

(5) Authentication Processing

The electronic signature included in the additional data is verified by using the public key certificate, so as to authenticate the two-dimensional symbol 1. Such authentication is executed by a normal method in public key infrastructure. More specifically, a first digest is created from the compatible data by using a hash function, and a second digest is decoded from the electronic signature by using the acquired public key certificate (public key). Then, values of the two digests are compared. In this way, it is confirmed that the creator of the two-dimensional symbol 1 is an owner of the public key certificate and that the compatible data recorded in the two-dimensional symbol 1 is not changed.

(6) Output Processing

In the case where the result of the authentication processing is normal, the compatible data is output together with public key information (the creator's name and the like). In the case where the result of the authentication processing is abnormal, an error message is output.

Just as described, in the case where the two-dimensional symbol 1 in this example is read by such a reading method, a person who reads the two-dimensional symbol can confirm that the creator of the two-dimensional symbol and the compatible data are not falsified at the time of confirming the decoded compatible data.

In the two-dimensional symbol in this example, the public key ID and the electronic signature are recorded in the second recording area. However, since a data volume of the public key ID is small, the data codeword for recording the public key ID may be recorded in the area where the pad codeword is recorded (a filler area) in the first recording area. In the method for reading a QR code, the filler area is regarded as an area where the data is not recorded, and thus is ignored. For this reason, the public key ID that is recorded in the filler area is not read by the method for reading a QR code and does not interfere with the method for reading a QR code.

SEVENTH EXAMPLE

In this example, the data that is recorded in the two-dimensional symbol in the fifth example is changed.

More specifically, in this example, as illustrated in FIG. 4D, the data codeword for recording the compatible data and the error correction codeword in the first recording area are recorded in duplicate in the second recording area and the third recording area. Just as described, in this example, the bit data for recording the compatible data is recorded in duplicate in the three recording areas. In this way, data error correction capability is improved. Here, the data codeword and the error correction codeword, which are recorded in each of the recording areas, are recorded in a portion that does not overlap corresponding portions, in which the same codewords are recorded, in the other recording areas in order to avoid simultaneous occurrence of errors in the corresponding codewords caused by stain.

In the two-dimensional symbol in this example, the compatible data, which is recorded in the first recording area, can be decoded by the method for reading a QR code. However, in the case where a frequency of an error in color identification of the reduced basic module 2b exceeds the error correction level due to the stain or the like, such an error cannot be corrected by the method for reading a QR code. Just as described, even in the case where the error in the color identification frequently occurs due to the stain or the like, in the two-dimensional symbol in this example, the compatible data is possibly decodable on the basis of the compatible data recorded in the second recording area and the third recording area.

For example, the two-dimensional symbol in this example is read by a reading method including the following procedure (1) to (6). In such a case, even when the error in the color identification frequently occurs due to the stain or the like, the compatible data can be decoded relatively reliably. In the following reading method, the first reading step according to the present invention corresponds to processing [2a] to [2c] in (2) first decoding processing, and the first error correction step according to the present invention corresponds to processing [2d] in (2) the first decoding processing. In addition, the second reading step according to the present invention corresponds to processing [3a] to [3b] in (3) second decoding processing, and the second error correction step according to the present invention corresponds to processing [3c] in (3) the second decoding processing. Furthermore, the third reading step according to the present invention corresponds to processing [4a] to [4e] in (4) third decoding processing, and the third error correction step according to the present invention corresponds to processing [4f] in (4) the third decoding processing. Moreover, the fourth error correction step according to the present invention corresponds to (5) majority vote correction processing, and the fifth error correction step according to the present invention corresponds to (6) fourth decoding processing.

(1) Imaging Processing

An image including the two-dimensional symbol in this example is captured by using the camera. In such imaging processing, two types of images are captured: a visible light image captured under white light illumination and an infrared light image captured under infrared light illumination. The camera may be built into the reader, or may externally be connected to the reader.

(2) First Decoding Processing

The reader decodes the compatible data, which is recorded in the first recording area, by the following procedure [2a] to [2d]. Such a procedure is a similar procedure to the known method for reading a QR code.

[2a]

The position of the two-dimensional symbol 1 is detected on the basis of the finder patterns 11 included in the visible light image.

[2b]

The distortion of the two-dimensional symbol 1 in the visible light image is corrected by using the alignment pattern 14. Then, the center coordinates of the reduced basic module 2b in the visible light image are determined by the timing pattern 13.

[2c]

Based on the color of the pixel in the center portion of each of the basic modules 2a, 2b in the visible light image, it is determined whether each of the reduced basic modules 2b is in either the light color or the dark color. Then, the bit data on the light/dark pattern is generated.

[2d]

The mask pattern processing is executed on the generated bit data. Thereafter, based on the error correction codeword, the detection and the correction of the error are attempted to decode the compatible data and output the decoded data. In the case where the detected error cannot be corrected, (3) the second decoding processing is executed.

(3) Second Decoding Processing

The reader decodes the compatible data, which is recorded in the second recording area, by the following procedure [3a] to [3c].

[3a]

Based on the center coordinates of the reduced basic module 2b, which are determined in above step [2b], the center coordinates of the additional module 3 are determined.

[3b]

Based on the color of the pixel in the center portion of the additional module 3 in the visible light image, it is determined whether the additional module 3 is in either the light color or the dark color. Then, the bit data on the light/dark pattern is generated.

[3c]

Based on the error correction codeword included in the generated bit data, the detection and the correction of the error are attempted to decode the compatible data and output the decoded data. In the case where the detected error cannot be corrected, (4) the third decoding processing is executed.

(4) Third Decoding Processing

The reader decodes the additional data by the following procedure [4a] to [4f].

[4a]

The position of the two-dimensional symbol 1 is detected on the basis of the finder patterns 11 included in the infrared light image.

[4b]

The distortion of the two-dimensional symbol 1 in the infrared light image is corrected by using the alignment pattern 14. Then, the center coordinates of the reduced basic module 2b in the infrared light image are determined by the timing pattern 13.

[4c]

Based on the center coordinates of the reduced basic module 2b, which are determined in above step [4b], the center coordinates of the additional module 3 are determined.

[4d]

Based on the color of the pixel in the center portion of each of the reduced basic module 2b and the additional module 3 in the infrared light image, the infrared light reflection rate of each of the reduced basic module 2b and the additional module 3 is identified, and bit data on the high-low pattern of the infrared light is generated.

[4e]

Based on the light/dark pattern of the reduced basic module 2b obtained in the second decoding processing, the light/dark pattern of the additional module 3 obtained in the third decoding processing, and the high-low pattern of the infrared light reflection rate obtained in the processing [4d], a bit pattern indicating a pattern of the infrared reflective black module and the infrared absorbing black module is generated.

[4f]

Based on the error correction codeword included in the generated bit data, the detection and the correction of the error are attempted to decode the compatible data and output the decoded data. In the case where the detected error cannot be corrected, (5) the majority vote correction processing is executed.

(5) Majority Vote Correction Processing

For three sets of the bit data whose errors cannot be corrected in the first, second, and third decoding processing, bits at the same positions are compared. Then, for the different bit, a correct bit is determined by majority vote. In this way, majority vote bit data for which the error is corrected is generated, and (6) the fourth decoding processing is executed.

(6) Fourth Decoding Processing

Based on the error correction codeword included in the generated majority vote bit data, the detection and the correction of the error are attempted to decode the compatible data and output the decoded data. In the case where the detected error cannot be corrected, the processing is executed again from (1) the imaging processing.

As described above, according to such a reading method, the data error is corrected by using the compatible data that is recorded in duplicate in the second recording area and the third recording area, and the data error is further corrected through the majority vote of the three sets of the bit data read from the recording areas. In this way, the compatible data can reliably be decoded. In particular, the error correction codeword recorded in each of the recording areas is the Reed-Solomon code and thus is excellent for correcting a burst error. However, correction capability of such an error correction codeword is not high for a random error. In contrast, the majority vote correction processing in the above reading method excels in correcting the random error. Therefore, the above reading method can reliably correct both of the burst error and the random error.

In this example, in the case where the second recording area and/or the third recording area does not have a sufficient capacity to record all the codewords recorded in the first recording area, the codewords exceeding the capacity are discarded. Then, when the data is decoded, the codewords recorded in the first recording area may be used in place of the discarded codewords.

The description has been made so far on the examples of the present invention. However, the present invention is not limited to the configurations in the above examples, and various modifications can be made to the configurations in the above examples within the scope that does not depart from the gist of the present invention. For example, the two-dimensional symbol in each of the above examples is compatible with the QR code. However, the two-dimensional symbol according to the present invention may be compatible with a matrix two-dimensional symbol (for example, data matrix) conforming to another standard. In addition, the data recorded in the two-dimensional symbol of the present invention is not limited to have the contents in the above examples but can appropriately be changed.

REFERENCE SIGNS LIST 1, 1b, 1c, 1d, 1e: Two-dimensional symbol
1a: QR code
2: Module
2a: Normal basic module (first module)
2b: Reduced basic module (first module)
3: Additional module (second module)
4: Surplus area
7: Function pattern
8: Encoded area
11: Finder pattern
12: Separation pattern
13: Timing pattern
14: Alignment pattern
15: Data code area
16: Format information code area

The invention claimed is:

1. A two-dimensional symbol comprising:
first modules that are arranged vertically and horizontally in a matrix such that centers of at least three or more first modules of the first modules that are arranged vertically are spaced apart at a first interval and centers of the at least three or more first modules of the first modules that are arranged horizontally are spaced apart at a second interval; and
second modules different from the first modules,
wherein the two-dimensional symbol comprises:
a finder pattern comprising a first set of the first modules that are contiguously arranged in horizontal and vertical directions to allow a symbol position to be detected using a coloration pattern of the first set of the first modules;
a timing pattern comprising a second set of the first modules to specify a center position of the first modules using a coloration pattern of the second set of the first modules;
a first recording area comprising a third set of the first modules to record first data, using a coloration pattern of the third set of the first modules; and
a second recording area comprising the second modules to record second data using a coloration pattern of the second modules,
wherein a size of one first module of the first modules in the finder pattern is larger than a size of one first module of the first modules in at least a part of an area of the two-dimensional symbol,
wherein the part of the area is different from the finder patten in the two-dimensional symbol, and
wherein one second module of the second modules in at least the part of the area is arranged in a portion that does not overlap the first modules and that includes an intermediate point between two adjacent first modules of the first modules in at least the part of the area.

2. The two-dimensional symbol according to claim 1, wherein
the first interval and the second interval equal to each other,
in at least the part of the area, each of the second modules is provided in a portion that includes a single intermediate point between two diagonally-adjacent first modules of the first modules, and
in at least the part of the area, each of the first modules and the second modules has a shape that encompasses a circular shape having a diameter larger than or equal to a half of the first interval and smaller than or equal to $1/\sqrt{2}$ of the first interval.

3. The two-dimensional symbol according to claim 2, wherein
in at least the part of the area, the diameter of the circular shape encompassed in each of the first modules and the second modules is equal to $1/\sqrt{2}$ of the first interval of the first modules.

4. The two-dimensional symbol according to claim 1, wherein
in at least the part of the area, each of the second modules is provided in a portion that includes any one of intermediate points between the vertically-adjacent, horizontally-adjacent, and diagonally-adjacent first modules.

5. The two-dimensional symbol according to claim 4, wherein
in at least the part of the area, each of the first module and the second module has a shape that encompasses a circular shape having a diameter of a half of the first or second interval of the first modules.

6. The two-dimensional symbol according to claim 1, wherein
in at least the part of the area, the first module and the second module have square shapes with equal areas and are adjacent to each other without any clearance therebetween.

7. The two-dimensional symbol according to claim 1, wherein
in the first recording area, the first data and an error correction code of the first data are recorded,
in the second recording area, the second data and an error correction code of the second data are recorded,
the error correction codes included in the first recording area and the second recording area are Reed-Solomon codes,
a format information recording section that indicates error correction capability of the error correction code of the first data is formed by the coloration pattern of the first modules, and
the error correction code of the second data has the same error correction capability as the error correction code of the first data.

8. The two-dimensional symbol according to claim 1, wherein
the second data is encrypted.

9. The two-dimensional symbol according to claim 1, wherein
the second data includes an electronic signature that is created at least from the first data, and
a public key ID with which a public key certificate can be specified is recorded, the public key certificate including a public key capable of decoding the electronic signature.

10. The two-dimensional symbol according to claim 1, wherein
the first modules form the finder pattern, the timing pattern, and the first recording area by a pattern of modules colored in a light color and modules colored in a dark color,
the second modules form the second recording area by a pattern of modules colored in the light color and modules colored in the dark color,
at least some of the first modules and the second modules are multivalued modules, each of which is colored to selectively have one of three or more types of light reflective properties, and
a third recording area where third data can be recorded is formed by a coloration pattern of the multivalued modules.

11. A method for reading the two-dimensional symbol according to claim 1 comprising:
an imaging step to capture an image of the two-dimensional symbol;
a first decoding step to determine the coloration pattern of the first modules in the first recording area on the basis of the image captured in the imaging step and decode the first data;
a second decoding step to determine the coloration pattern of the second modules in the second recording area on the basis of the image captured in the imaging step and decode the second data; and
a data processing step to execute processing that associates the first data and the second data with each other.

12. A method for reading the two-dimensional symbol according to claim 1 comprising:
an imaging step to capture an image of the two-dimensional symbol;
a first decoding step to determine the coloration pattern of the first modules in the first recording area on the basis of the image captured in the imaging step and decode the first data; and
a second decoding step to determine the coloration pattern of the second modules in the second recording area on the basis of the image captured in the imaging step and decode the second data, wherein
in the first decoding step, the center position of the first modules in the image is specified on the basis of the finder pattern and the timing pattern included in the image captured in the imaging step, and
in the second decoding step, the intermediate point between the adjacent first modules in the image is specified on the basis of the center position of the first modules specified in the first decoding step, and a color of the second module is identified on the basis of a color near the intermediate point.

13. A method for reading the two-dimensional symbol according to claim 9 comprising:
an imaging step to capture an image of the two-dimensional symbol;
a decoding step to decode the first data, the electronic signature, and the public key ID that are recorded in the two-dimensional symbol on the basis of the image captured in the imaging step;
a certificate specifying step to specify the public key certificate on the basis of the public key ID read in the decoding step;
a verification step to verify the electronic signature read in the decoding step on the basis of the public key certificate; and
a data output step to output the first data read in the decoding step in the case where it is determined in the verification step that the electronic signature is normal.

14. A method for reading the two-dimensional symbol according to claim 10 in which predetermined data and an error correction code of the predetermined data are recorded in duplicate in the first recording area, the second recording area, and the third recording area, the method for reading the two-dimensional symbol comprising:
a first reading step to identify a light/dark pattern of the first modules to read the predetermined data and the error correction code recorded in the first recording area;
a first error correction step to verify presence or absence of an error in the read predetermined data on the basis of the error correction code read in the first reading step and correct the error when the error is detected;
a second reading step to identify a light/dark pattern of the second modules to read the predetermined data and the error correction code recorded in the second recording area;
a second error correction step to verify presence or absence of an error in the read predetermined data on the basis of the error correction code read in the second reading step and correct the error when the error is detected;

a third reading step to identify a light reflective property other than that of a light/dark pattern of the multivalued modules and read the predetermined data and the error correction code recorded in the third recording area;

a third error correction step to verify presence or absence of an error in the read predetermined data on the basis of the error correction code read in the third reading step and correct the error when the error is detected;

a fourth error correction step to correct an error through majority vote of three sets of bit data for three sets of the predetermined data and the error correction code read in the first reading step, the second reading step, and the third reading step; and a fifth error correction step to verify presence or absence of an error in the predetermined data, which is corrected in the fourth error correction step, on the basis of the error correction code, which is corrected in the fourth error correction step, and correct the error when the error is detected, wherein in the case where the correction of the error in the predetermined data fails in the first error correction step, the second error correction step, and the third error correction step, the fourth error correction step and the fifth error correction step are executed.

* * * * *